United States Patent
Yang et al.

(10) Patent No.: US 8,277,970 B2
(45) Date of Patent: Oct. 2, 2012

(54) POUCH-TYPE SECONDARY BATTERY HAVING AN NON-SEALING RESIDUE PORTION

(75) Inventors: Seung-Jin Yang, Daejeon (KR); Jeong Hee Choi, Busan (KR); Hanho Lee, Daejeon (KR); Ji Heon Ryu, Seoul (KR)

(73) Assignee: LG Chem, Ltd. (KR)

( * ) Notice: Subject to any disclaimer, the term of this patent is extended or adjusted under 35 U.S.C. 154(b) by 298 days.

(21) Appl. No.: 12/309,912

(22) PCT Filed: Jul. 21, 2007

(86) PCT No.: PCT/KR2007/003531
§ 371 (c)(1),
(2), (4) Date: Oct. 5, 2009

(87) PCT Pub. No.: WO2008/016229
PCT Pub. Date: Feb. 7, 2008

(65) Prior Publication Data
US 2010/0028772 A1 Feb. 4, 2010

(30) Foreign Application Priority Data
Jul. 31, 2006 (KR) .................. 10-2006-0071834

(51) Int. Cl.
*H01M 2/02* (2006.01)
*H01M 10/04* (2006.01)
(52) U.S. Cl. ...................... 429/162; 429/185
(58) Field of Classification Search .................. 429/162, 429/185
See application file for complete search history.

(56) References Cited

U.S. PATENT DOCUMENTS

| | | | |
|---|---|---|---|
| 4,678,725 A | | 7/1987 | Kikuchi et al. |
| 6,048,638 A | * | 4/2000 | Pendalwar ..................... 429/127 |
| 6,254,648 B1 | | 7/2001 | Noh et al. |
| 6,371,996 B1 | * | 4/2002 | Takayama et al. ........... 29/623.2 |
| 2004/0038126 A1 | | 2/2004 | Gu |
| 2005/0170243 A1 | * | 8/2005 | Ozawa et al. ................. 429/162 |
| 2007/0072071 A1 | * | 3/2007 | Lee ............................... 429/162 |

FOREIGN PATENT DOCUMENTS

| | | | |
|---|---|---|---|
| JP | 10308240 A | * | 11/1998 |
| JP | 2003055573 | | 9/2004 |
| JP | 2005-222872 A | | 8/2005 |
| JP | 2005-332726 A | | 12/2005 |
| KR | 20010082058 A | | 8/2001 |
| KR | 20010082059 A | | 8/2001 |
| KR | 20010082060 A | | 8/2001 |
| KR | 20030039703 | | 5/2003 |

* cited by examiner

*Primary Examiner* — Gregg Cantelmo
(74) *Attorney, Agent, or Firm* — Lerner, David, Littenberg, Krumholz & Mentlik, LLP

(57) ABSTRACT

Disclosed herein is a secondary battery including an electrode assembly of a cathode/separator/anode structure mounted in a pouch-shaped battery case in a sealed state, wherein a residue portion, which is not sealed (non-sealing residue portion), is defined between a sealing portion of the battery case and the electrode assembly for collecting generated gas, and the non-sealing residue portion is formed by mounting the electrode assembly between upper and lower laminate sheets, at least one of which has a receiving part of a size approximately corresponding to the electrode assembly, sealing three sides of the upper and lower laminate sheets, including two sides where electrode terminals are disposed, among four sides of the upper and lower laminate sheets, injecting an electrolyte in the battery case through the non-sealing portion, and sealing the non-sealing portion such that the resultant sealing portion is spaced a predetermined width from the receiving part.

8 Claims, 7 Drawing Sheets

POUCH-TYPE SECONDARY BATTERY HAVING AN NON-SEALING RESIDUE PORTION

CROSS REFERENCE TO RELATED APPLICATIONS

The present application is a national phase entry under 35 U.S.C. §371 of International Application No. PCT/KR2007/003531, filed Jul. 21, 2007, published in English, which claims the benefit of Korean Patent Application No. KR10-2006-0071834, filed Jul. 31, 2006. The disclosures of said applications are incorporated by reference herein.

FIELD OF THE INVENTION

The present invention relates to a pouch-shaped secondary battery having a non-sealing residue portion, and, more particularly, to a secondary battery including an electrode assembly mounted in a pouch-shaped battery case in a sealed state, wherein a residue portion, which is not sealed (non-sealing residue portion), is defined between a sealing portion of the battery case and the electrode assembly for collecting generated gas, and the non-sealing residue portion is formed at the outside of an electrode assembly receiving part adjacent to the one-side sealing portion.

BACKGROUND OF THE INVENTION

As mobile devices have been increasingly developed, and the demand for such mobile devices has increased, the demand for batteries has also sharply increased as an energy source for the mobile devices. Also, much research on batteries satisfying various needs has been carried out.

In terms of the shape of batteries, the demand for prismatic secondary batteries or pouch-shaped secondary batteries, which are thin enough to be applied to products, such as mobile phones, is very high. In terms of the material for batteries, the demand for lithium secondary batteries, such as lithium ion batteries and lithium ion polymer batteries, having high energy density, high discharge voltage, and high output stability, is very high.

Furthermore, secondary batteries may be classified based on the construction of an electrode assembly having a cathode/separator/anode structure. For example, the electrode assembly may be constructed in a jelly-roll (winding) type structure in which long-sheet type cathodes and anodes are wound while separators are disposed respectively between the cathodes and the anodes, a stacking type structure in which pluralities of cathodes and anodes having a predetermined size are successively stacked while separators are disposed respectively between the cathodes and the anodes, or a stacking/folding type structure in which pluralities of cathodes and anodes having a predetermined size are successively stacked while separators are disposed respectively between the cathodes and the anodes to constitute a bi-cell or a full-cell, and then the bi-cell or the full-cell is wound.

Recently, much interest has been taken in a pouch-shaped battery constructed in a structure in which such a stacking or stacking/folding type electrode assembly is mounted in a pouch-shaped battery case made of an aluminum laminate sheet because of low manufacturing costs, light weight, and easy modification in shape. As a result, the use of the pouch-shaped battery has gradually increased.

FIG. 1 is an exploded perspective view typically illustrating the general structure of a conventional representative pouch-shaped secondary battery.

Referring to FIG. 1, the pouch-shaped secondary battery 10 includes an electrode assembly 30, pluralities of electrode tabs 40 and 50 extending from the electrode assembly 30, electrode leads 60 and 70 welded to the electrode tabs 40 and 50, respectively, and a battery case 20 for receiving the electrode assembly 30.

The electrode assembly 30 is a power generating element comprising cathodes and anodes successively stacked while separators are disposed respectively between the cathodes and the anodes. The electrode assembly 30 is constructed in a stacking structure or a stacking/folding structure. The electrode tabs 40 and 50 extend from corresponding electrode plates of the electrode assembly 30. The electrode leads 60 and 70 are electrically connected to the electrode tabs 40 and 50 extending from the corresponding electrode plates of the electrode assembly 30, respectively, for example, by welding. The electrode leads 60 and 70 are partially exposed to the outside of the battery case 20. To the upper and lower surfaces of the electrode leads 60 and 70 are partially attached insulative films 80 for improving sealability between the battery case 20 and the electrode leads 60 and 70 and, at the same time, for securing electrical insulation between the battery case 20 and the electrode leads 60 and 70.

The battery case 20 is made of an aluminum laminate sheet. The battery case 20 has a space defined therein for receiving the electrode assembly 30. The battery case 20 is formed generally in the shape of a pouch. In the case that the electrode assembly 30 is a stacking type electrode assembly as shown in FIG. 1, the inner upper end of the battery case 20 is spaced apart from the electrode assembly 30 such that the plurality of cathode tabs 40 and the plurality of anode tabs 50 can be coupled to the electrode leads 60 and 70, respectively.

When the pouch-shaped battery is overcharged, exposed to high temperature, or short-circuited, a large amount of gas is generated due to the decomposition of an electrolyte, with the result that the battery case swells, i.e., a so-called swelling phenomenon occurs. This swelling phenomenon accelerates the decomposition of the electrolyte, while inducing high pressure in the sealed battery case, thereby inducing the explosion of the battery. Furthermore, the central portion of the battery case swells due to the generated gas, and therefore, the battery is deformed. As a result, a short circuit occurs in the battery.

In order to solve this problem, there have been proposed several methods of forming a predetermined non-sealing portion between an electrode assembly and a sealing portion of a battery case. For example, Japanese Patent Application Publication No. 2005-332726 and No. 2005-222872 disclose secondary batteries each having an stacking type electrode assembly mounted in a receiving part of a laminate sheet, each secondary battery being constructed in a structure in which a non-sealing portion is formed between the receiving part of the laminate sheet, in which the electrode assembly is mounted, and a sealing portion of the laminate sheet, such that the sealing portion, which is welded at one side of the laminate sheet, is widened, in an abnormal operating condition of the secondary battery, for example, when the secondary battery is overcharged or the interior temperature of the secondary battery is greatly increased, with the result that gas is discharged out of the secondary battery.

Specifically, Japanese Patent Application Publication No. 2005-332726 discloses a structure in which a space having a predetermined width is formed inside the receiving part of the laminate sheet, in which the electrode assembly is mounted, along the outer circumference of the receiving part. As a result, the size of the receiving part is large as compared to the size of the electrode assembly. Consequently, it is difficult to correctly position of the electrode assembly in the receiving part, such that the space is formed inside the receiving part, in a practical manufacturing process. Furthermore, it is difficult to construct the secondary battery such that sealed gas discharge region is reliably widened when high pressure is generated in the secondary battery.

Also, Japanese Patent Application Publication No. 2005-222872 discloses a structure in which a gas channel, for allowing a gas discharge region to be reliably widened, is mounted in a laminate battery case, and a gas channel guide member is made of a material having a higher strength than that of the laminate sheet. Consequently, the manufacturing process is complicated, and manufacturing costs are high, with the result that the disclosed structure is limited to be applied to a practical manufacturing process.

Consequently, there is a high necessity for a technology to fundamentally solve the above-mentioned problems.

SUMMARY OF THE INVENTION

Therefore, the present invention has been made to solve the above problems, and other technical problems that have yet to be resolved.

Specifically, an object of the present invention is to provide a secondary battery including an electrode assembly received in a receiving part of a laminate sheet, wherein a non-sealing portion, through which an electrolyte is injected into a battery case, is not sealed at a region adjacent to the electrode assembly, but a non-sealing residue portion is formed between the sealing portion of the battery case and the electrode assembly for collecting gas generated due to the decomposition of the electrolyte under an abnormal operating condition of the battery, whereby the generation of high pressure in the battery case and the deformation of the battery are effectively prevented under the abnormal operating condition.

Another object of the present invention is to provide a secondary battery that can be easily manufactured while the safety of the battery is secured.

In accordance with one aspect of the present invention, the above and other objects can be accomplished by the provision of a secondary battery including an electrode assembly of a cathode/separator/anode structure mounted in a pouch-shaped battery case in a sealed state, wherein a residue portion, which is not sealed (non-sealing residue portion), is defined between a sealing portion of the battery case and the electrode assembly for collecting generated gas, and the non-sealing residue portion is formed by (a) mounting the electrode assembly between upper and lower laminate sheets, at least one of which has a receiving part of a size approximately corresponding to the electrode assembly, (b) sealing three sides of the upper and lower laminate sheets, including two sides where electrode terminals are disposed, among four sides of the upper and lower laminate sheets, (c) injecting an electrolyte in the battery case through the non-sealing portion, and (d) sealing the non-sealing portion at a region where the non-sealing portion is spaced a predetermined width from the receiving part.

As described above, the pouch-shaped battery according to the present invention includes the non-sealing residue portion, defined between the sealing portion of the battery case and the electrode assembly for collecting gas. Consequently, when high pressure is generated in the battery due to an abnormal operating condition, such as the overcharge of the battery or the exposure of the battery to high temperature, the non-sealing residue portion expands primarily to collect generated gas within the allowable volume of the non-sealing residue portion, thereby restraining the increase in internal pressure of the battery.

Also, the non-sealing residue portion, for collecting the generated gas, is not located in the electrode assembly receiving part. Consequently, it is not necessary to manufacture the receiving part such that the receiving part has a size greater than necessary, and therefore, it is easy to receive the electrode assembly in the receiving part.

The electrode assembly is not particularly restricted so long as the electrode assembly is constructed in a structure in which a plurality of electrode tabs are connected to form cathodes and anodes. Preferably, the electrode assembly is constructed in a winding, stacking, or stacking/folding type structure. The details of the stacking/folding type electrode assembly are disclosed in Korean Patent Application Publication No. 2001-0082058, No. 2001-0082059, and No. 2001-0082060, which have been filed in the name of the applicant of the present patent application. The disclosures of the above-mentioned patent publications are hereby incorporated by reference as if fully set forth therein.

Preferably, the secondary battery according to the present invention is applied to a pouch-shaped secondary battery including an electrode assembly mounted in a receiving part of a pouch-shaped case made of a laminate sheet, for example an aluminum laminate sheet, including a resin layer and a metal layer.

Generally, the pouch-shaped secondary battery is constructed in a structure in which the electrode assembly is mounted in the receiving part of the pouch-shaped battery case made of, for example, the aluminum laminate sheet. Specifically, the pouch-shaped secondary battery is manufactured by forming the receiving part, for receiving the electrode assembly, at the laminate sheet, and thermally welding an additional sheet separated from the laminate sheet or a sheet extending from the laminate sheet, while the electrode assembly is placed in the receiving part, to seal the receiving part.

Consequently, the laminate sheet may be constructed in a structure in which the electrode assembly receiving part is formed at least one of the upper and lower laminate sheets at step (a). Specifically, the upper and lower laminate sheets may be separated from each other or connected to each other at one-side ends thereof. In this pouch-shaped case, a laminate sheet having a thickness of dozens or hundreds of centimeters is partially pressed, in a drawing process using a die and a punch, to form the receiving part.

Preferably, the laminate sheet is constructed in a structure in which the upper and lower laminate sheets are joined to each other at one-side ends thereof.

The two-unit separation type battery case is constructed in a structure in which the two battery case units are joined to each other at four sides thereof, thereby forming the sealing portion. As a result, the four-side sealing portion is exposed to the atmosphere, and therefore, a possibility of air (especially, moisture) penetrating the battery case is greatly increased after the battery case is used for a long period of time. Consequently, the life span of the battery is reduced. In the battery case constructed in the structure in which the one-side ends thereof are connected to each other, on the other hand, the above-mentioned problem does not occur.

Also, the receiving part of the laminate sheet of the secondary battery according to the present invention is constructed in a shape approximately corresponding to the electrode assembly, as defined in step (a). As previously described, the inside surface of the receiving part is formed in the shape of a downward inclined surface (tapered surface) in order to prevent the breakage of the sheet when the receiving part is formed by the drawing process. According to the present invention, the bottom surface of the receiving part has a size approximately corresponding to the electrode assembly. Consequently, when the electrode assembly is inserted in the receiving part through the open upper end, which has a size slightly greater than that of the electrode assembly, the side of the electrode assembly stably reaches the bottom surface of the receiving part along the downward inclined surface of the receiving part in spite of the positional error of the electrode assembly in the receiving part, and therefore, the installation of the electrode assembly is very easily accomplished.

At step (b), the three sides of the upper and lower laminate sheets, including the two sides where electrode terminals are disposed, among the four sides of the upper and lower laminate sheets are sealed. In the battery case constructed in the structure in which the one-side ends thereof are connected to each other, as previously described, only two sides of the battery case may be sealed.

The electrode terminals may relatively lower the sealability of the sealing portion due to the material and the thickness thereof. For this reason, it is necessary to seal the electrode terminals during the above-described sealing process.

The electrolyte is injected into the battery case through the non-sealing portion left by the partial sealing process at step (c), and the activation process is carried out at step (d). The non-sealing portion is resealed at step (e) after the electrolyte injection process and the activation process. For this reason, the non-sealing portion is formed such that the non-sealing portion is larger than the remaining sealing portion. In this case, the width A of the side including the non-sealing portion is not particularly restricted so long as the width A of the side including the non-sealing portion is greater than the width L of the remaining sides including the sealing portion. The width of the side including the non-sealing portion is preferably 10 to 50%, more preferably 15 to 25%, greater than that of the remaining sides including the sealing portion. This may be represented by the following equation: $A=L+(0.1\sim0.5)L$.

A lithium secondary battery uses metal oxide, such as $LiCoO_2$, as a cathode active material, and carbon as an anode active material. Polyolefin-based porous separators are disposed between anodes and cathodes, and a non-aqueous electrolyte including lithium salt, such as $LiPF_6$, is injected into the lithium secondary battery. In this way, the lithium secondary battery is manufactured. During the charge of the lithium secondary battery, lithium ions are discharged from the cathode active material and inserted into a carbon layer of the anode. During the discharge of the lithium secondary battery, on the other hand, lithium ions are discharged from the carbon layer of the anode and inserted into the cathode active material. At this time, the non-aqueous electrolyte serves as a medium to move the lithium ions between the respective anodes and cathodes. It is necessary for the lithium secondary battery to be basically stable within the operating voltage range of the battery and have a performance to transfer ions at a sufficiently high speed.

However, the electrolyte is decomposed at the surface of the anode active material, during the continuous charge and discharge of the battery, with the result that gas is generated. In the initial charge and discharge of the battery, a solid electrolyte interface (SEI) film is formed at the surface of the anode active material for restraining the further generation of gas. The activation process carried out at step (d) is necessary to form the SEI film, which is required before the completion of the battery.

In a preferred embodiment, after step (c) and before step (d), a step of sealing only the outer circumferential end region (end sealing portion) of the non-sealing portion, through which the electrolyte is injected into the battery case, to form a gas pocket of a predetermined size in the battery case, and cutting the end sealing portion to remove gas generated during an activation process and discharge an excess of the electrolyte or replenish an shortage of the electrolyte is further carried out.

The width B of the gas pocket part is not particularly restricted so long as the width B of the gas pocket part is a predetermined portion of the width A of the corresponding side. Preferably, the width B of the gas pocket part is 30 to 60% that of the corresponding side. This may be represented by the following equation: $B=(0.3\sim0.6)A$.

According to circumstances, when the electrolyte has been consumed during the activation process or when the electrolyte has been insufficiently injected into the battery case during the manufacturing process of the battery, the electrolyte may be replenished through a second injection process. In this case, the battery is left as it is for a predetermined period of time (for example, 12 hours), and then an activation process and a charge process may be carried out again.

At step (d), the non-sealing portion is sealed at the region where the non-sealing portion is spaced a predetermined width from the receiving part. The non-sealing residue portion has a width C equivalent to, preferably 10 to 40%, more preferably 20 to 30%, the width A of the corresponding side. This may be represented by the following equation: $C=(0.3\sim0.6)A$. When the width C of the non-sealing residue portion is less than 10%, the effect of collecting gas generated under an abnormal operating condition to prevent the explosion of the battery is slight. When the width C of the non-sealing residue portion is greater than 40%, on the other hand, the size of the battery is increased, which is not preferred.

The specific side having the width A, including the non-sealing residue portion having the width C, has a lower joint force than the remaining sealing portion having the width L. Consequently, when high pressure is generated in the battery, the non-sealing residue portion having the width C, which is located at the above-specified side among the four sides of the battery case, expands primarily to restrain the increase in internal pressure of the battery, and, when high pressure greater than a critical value is generated in the battery, the sealing portion of the side having the width A adjacent to the non-sealing residue portion is widened secondarily to discharge high-pressure gas. Consequently, the explosion of the battery is prevented, and therefore, the safety of the battery is secured.

Preferably, the secondary battery according to the present invention is a lithium secondary battery. Especially, the present invention is particularly applied to a so-called a lithium ion polymer battery having an electrode assembly impregnated with a lithium-containing electrolyte in the form of a gel.

In accordance with another aspect of the present invention, there is provided a middle- or large-sized battery pack including the pouch-shaped battery as a unit cell.

The middle- or large-sized battery pack includes a plurality of unit cells. For this reason, a chain reaction may be induced when some of the unit cells are abnormally operated. Consequently, it is possible to further improve the overall safety of the battery pack by including the above-described non-sealing residue portion.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
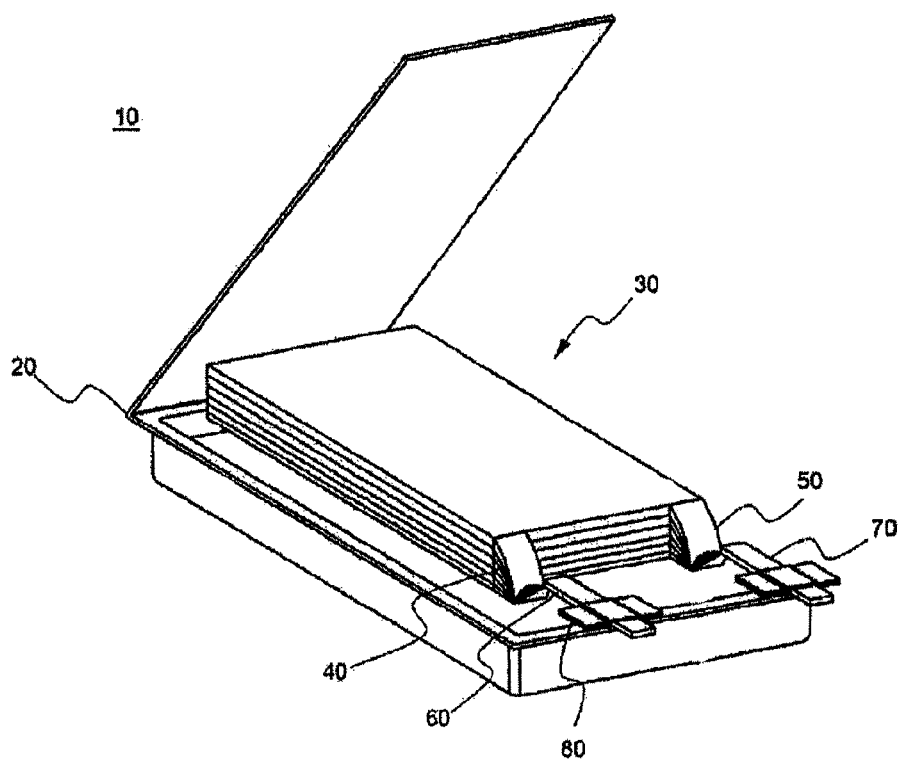
FIG. 1 is an exploded perspective view illustrating the general structure of a conventional pouch-shaped secondary battery.
Figure 2:
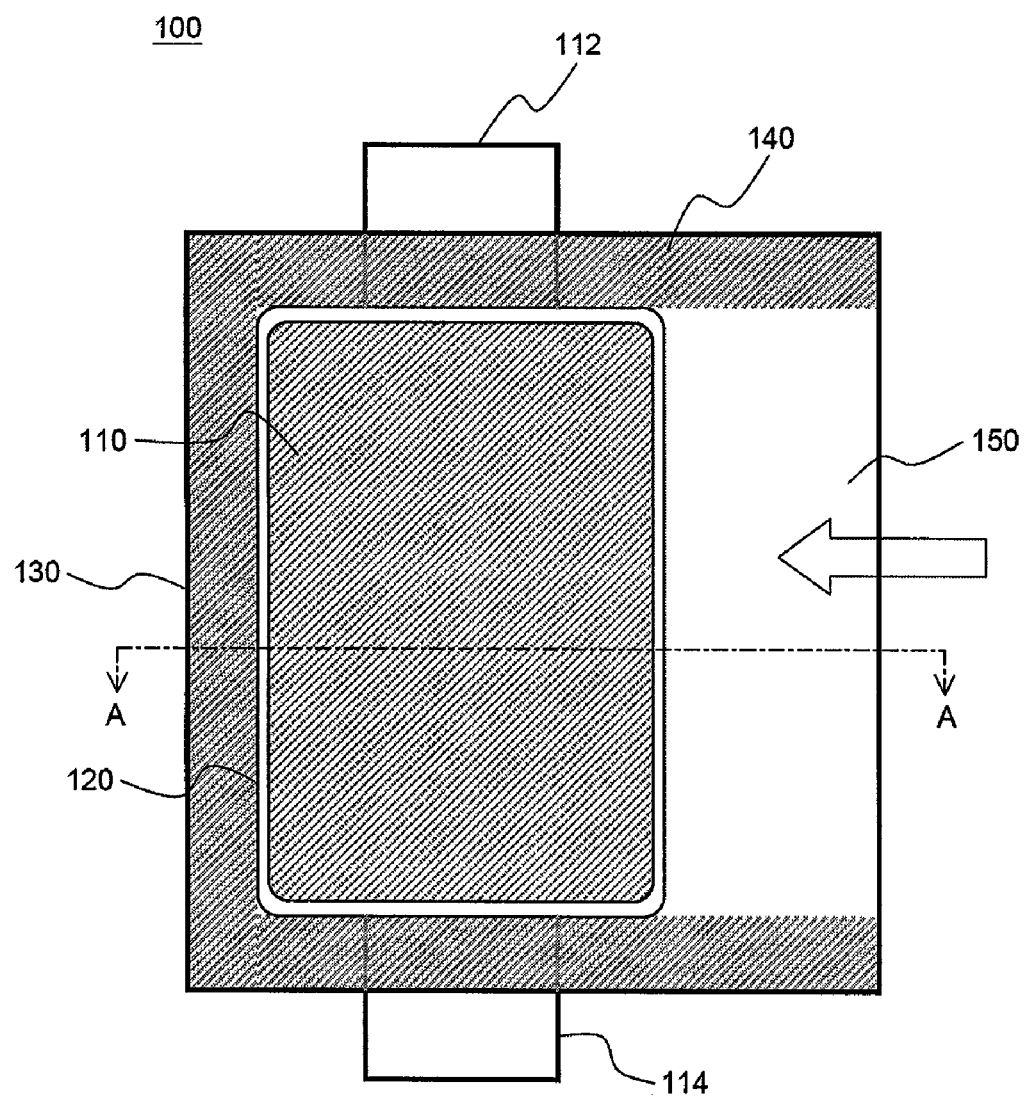
FIG. 2 is typical view illustrating a step of injecting an electrolyte during the manufacture of a pouch-shaped secondary battery according to the present invention.

FIG. 2 is typical view illustrating a step of injecting an electrolyte during the manufacture of a pouch-shaped secondary battery according to the present invention.

Referring to FIG. 2, the pouch-shaped secondary battery 100 is constructed in a structure in which an electrode assembly 110, to which electrode terminals 112 and 114 are connected, is mounted in a battery case 130 including two laminate sheets, one of which has a receiving part 120. The battery case 130 is provided at three sides thereof, including the top side and the bottom side of the battery case 130, at which the electrode terminals 112 and 114 are disposed, respectively, with a sealing portion 140, which is formed by a thermal press. The battery case 130 is provided at the remaining side thereof with a non-sealing portion 150. An electrolyte is injected into the battery case 130 through the non-sealing portion 150.

Figure 3:
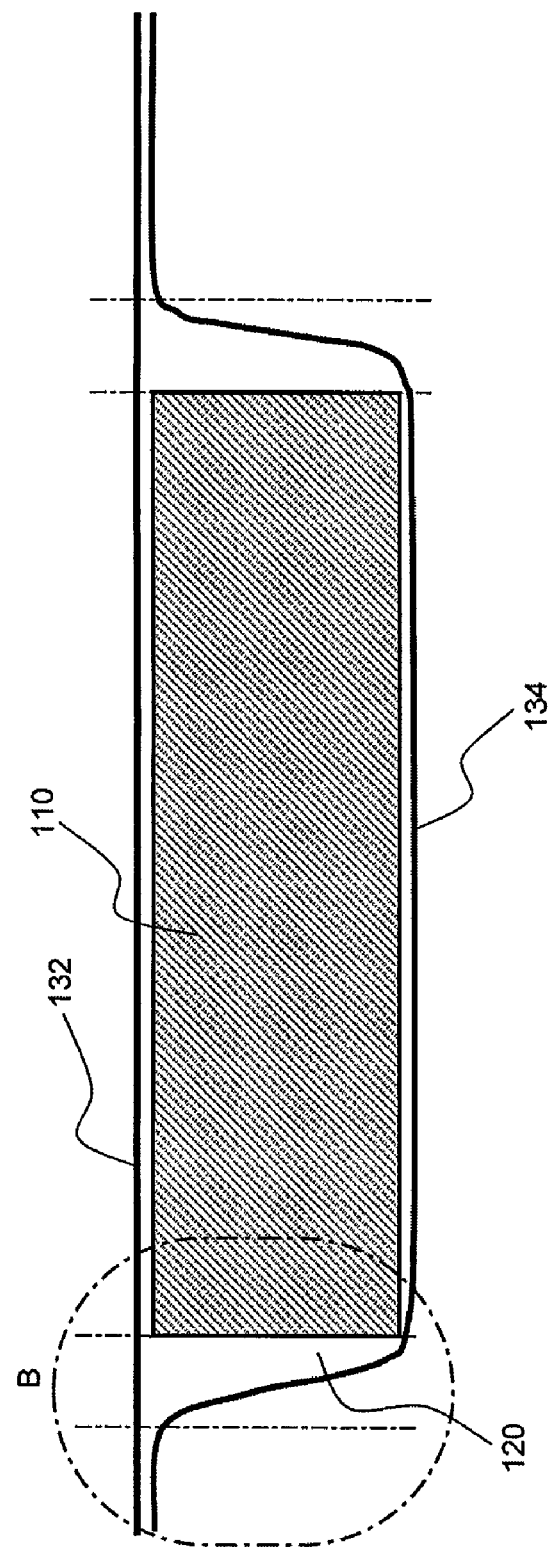
FIG. 3 is a vertical sectional view taken along line A-A of FIG. 2.
Figure 4:
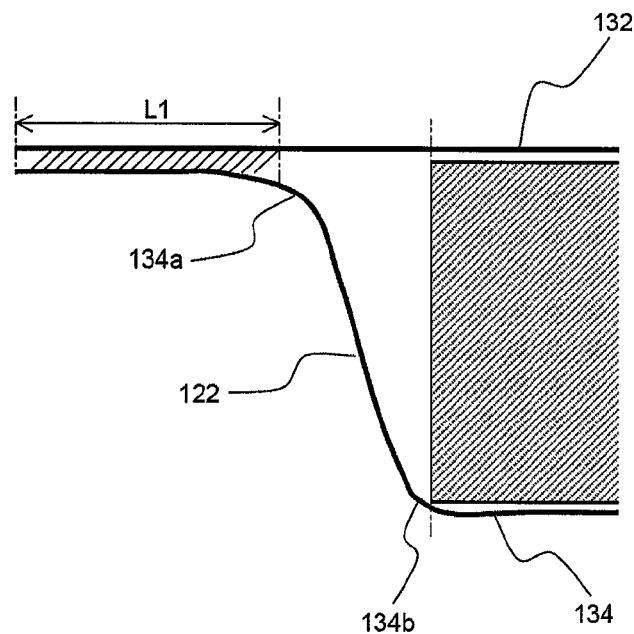
FIG. 4 is an enlarged view, in section, illustrating a drawn portion B of FIG. 3.

FIG. 3 is a vertical sectional view taken along line A-A of FIG. 2, and FIG. 4 is an enlarged view, in section, typically illustrating a drawn portion B of FIG. 3.

Referring to these drawings, the electrode assembly is received in the receiving part 120 of the lower case 134, and is covered by the upper case 132. The contact area L1 between the upper case 132 and the lower case 134 is sealed.

An aluminum laminate sheet having a thickness of approximately 113 μm is partially pressed by a drawing process using a die and a punch, whereby the receiving part 120 is formed at the lower case 134. The sheet having such a small thickness may be torn when the sheet is pressed. Consequently, it is necessary to form bent regions 134a and 134b gently in the drawing process. As a result, the side surface of the receiving part is formed in the shape of a downward inclined surface 122, and the top surface of the receiving part 120 is slightly greater than the bottom surface of the receiving part 120. The electrode assembly 110 has a size approximately corresponding to the bottom surface of the receiving part 120. Consequently, the electrode assembly 110 is easily received in the receiving part 12 although a positional error somewhat occurs when the electrode assembly 110 is received in the receiving part 120.

Figure 5:
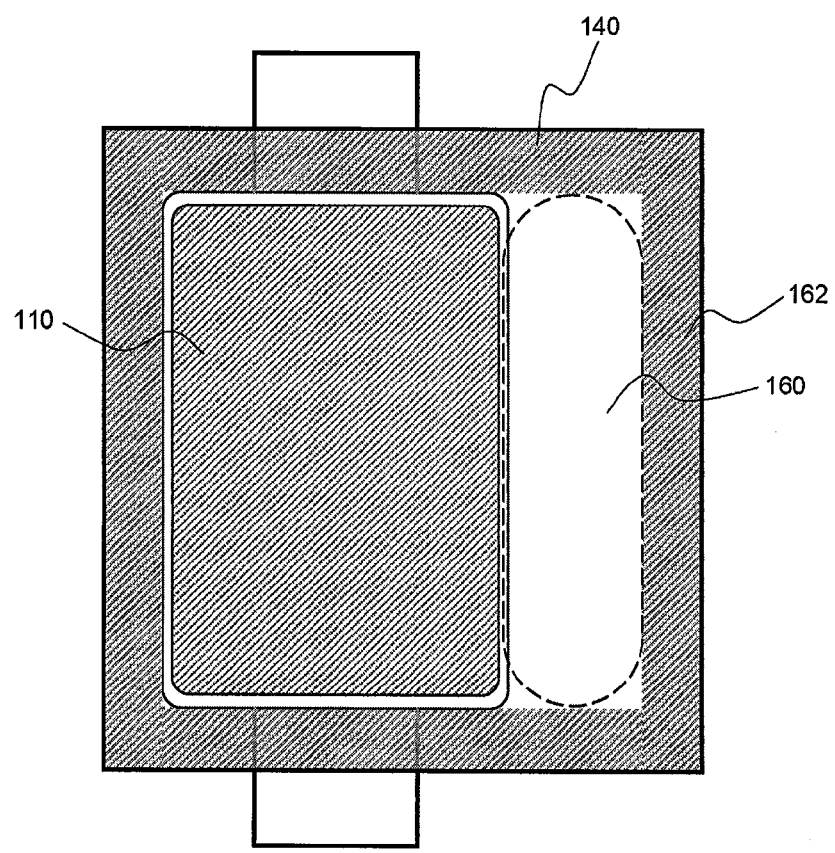
FIG. 5 is typical view illustrating a step of performing an activation process, while a gas pocket part is defined in a non-sealing portion, after the electrolyte injection step is completed, according to a preferred embodiment of the present invention.

FIG. 5 is typical view illustrating a step of performing an activation process, while a gas pocket part is defined in a non-sealing portion, after the electrolyte injection step is completed, according to a preferred embodiment of the present invention.

Referring to FIG. 5, the non-sealing portion 150 (see FIG. 2) of the battery case is sealed, with a predetermined width, only at the outer circumferential end of the battery case, to define a relatively large gas pocket part 160. The end sealing portion 162 is formed to define the gas pocket part 160, which serves to temporarily collect gas generated during the activation process. Consequently, the width of the end sealing portion 162 is less than that of the remaining sealing portion 140.

As previously described, a protective film is formed at the anodes of the electrode assembly 110, during the initial charge and discharge of the secondary battery through the activation process. At this time, some of a carbonate compound is decomposed, and gas, generated by the decomposition, is collected in the gas pocket part 160. Through the activation process, the previously protective film may reduce an additional amount of gas generated under a normal operating condition when a finally completed battery cell is charged.

Figure 6:
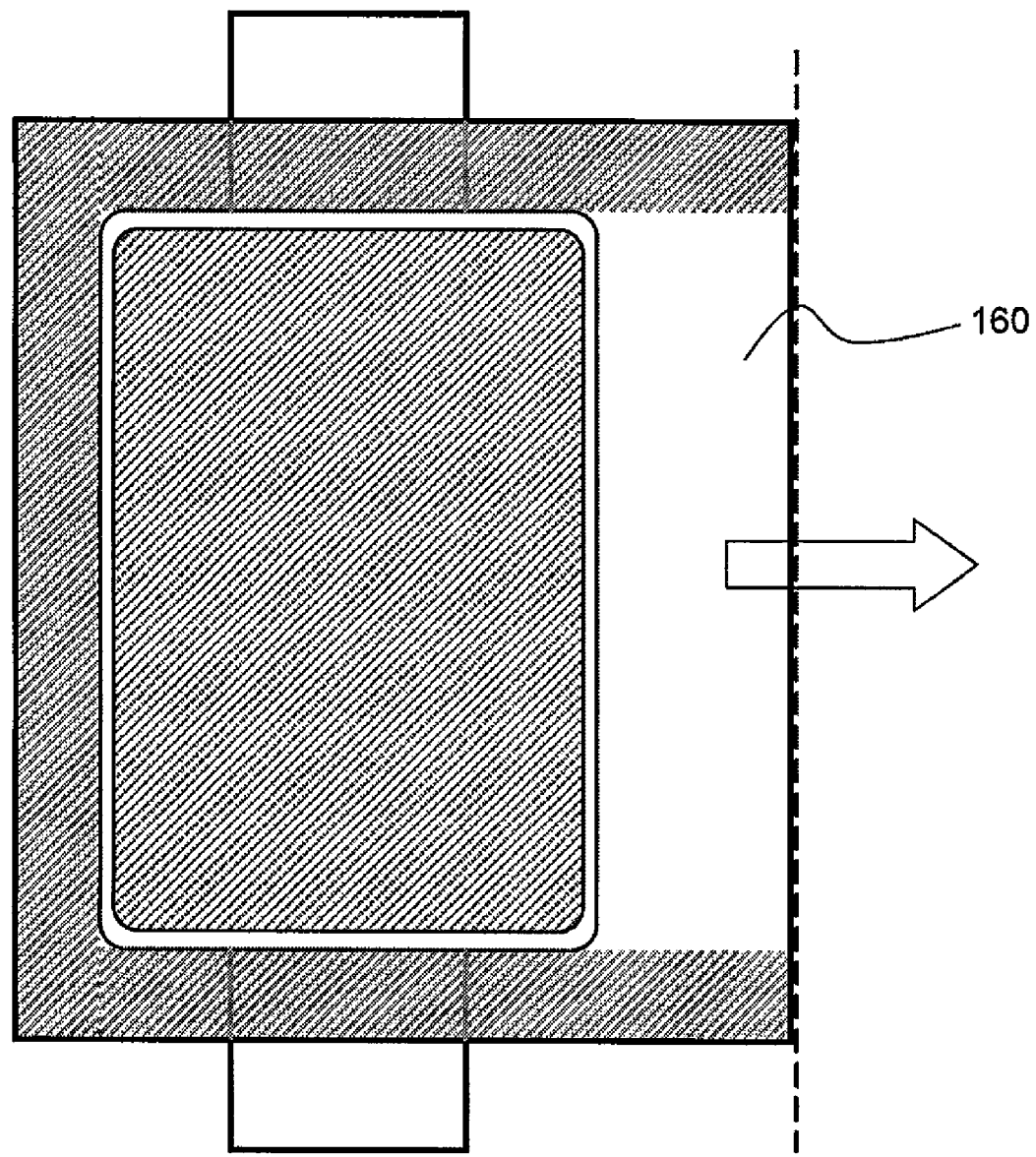
FIGS. 6 and 7 are typical views illustrating a step of removing an end sealing portion to discharge collected gas and a step of forming a non-sealing residue portion, respectively.
Figure 7:
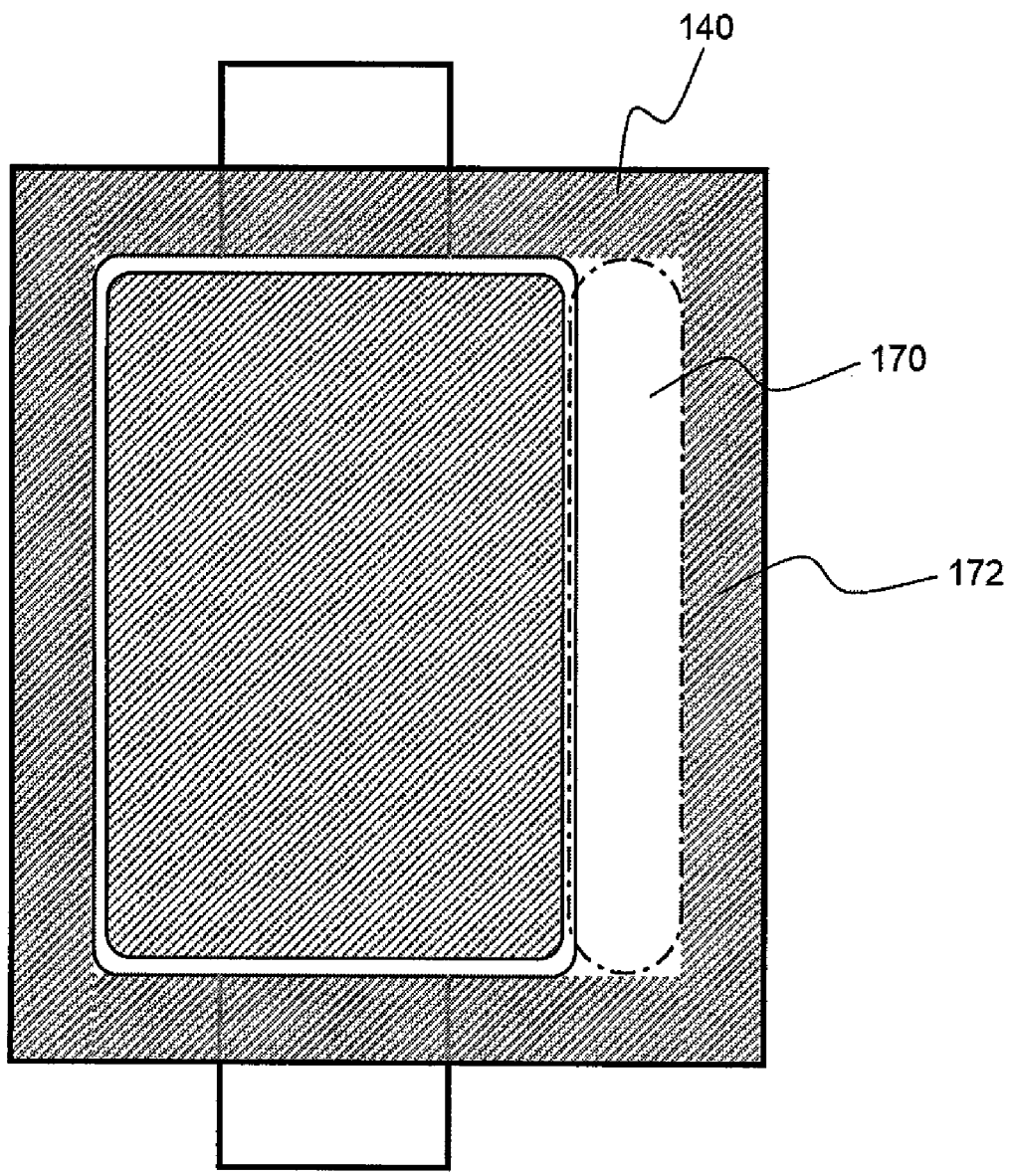

FIGS. 6 and 7 are typical views illustrating a step of removing an end sealing portion to discharge collected gas and a step of forming a non-sealing residue portion, respectively.

Referring first to FIG. 6, the gas pocket 160 is partially removed to remove the end sealing portion 162 shown in FIG. 5, with the result that gas collected in the gas pocket part 160 is removed. At this time, an excess of the electrolyte may be squeezed out and/or a shortage of the electrolyte may be replenished. The cut size of the gas pocket part 160 is appropriately adjusted such that a sealing portion having a predetermined size is formed while a non-sealing residue portion is formed.

Referring to FIG. 7, a predetermined outer circumferential portion is sealed to form a side sealing portion 172 such that a non-sealing residue portion 170 is formed. As previously described, the side sealing portion 172 preferably has a smaller width than that of the remaining sealing portion 140, although the width of the side sealing portion 172 may be equal to that of the remaining sealing portion 140.

Figure 8:
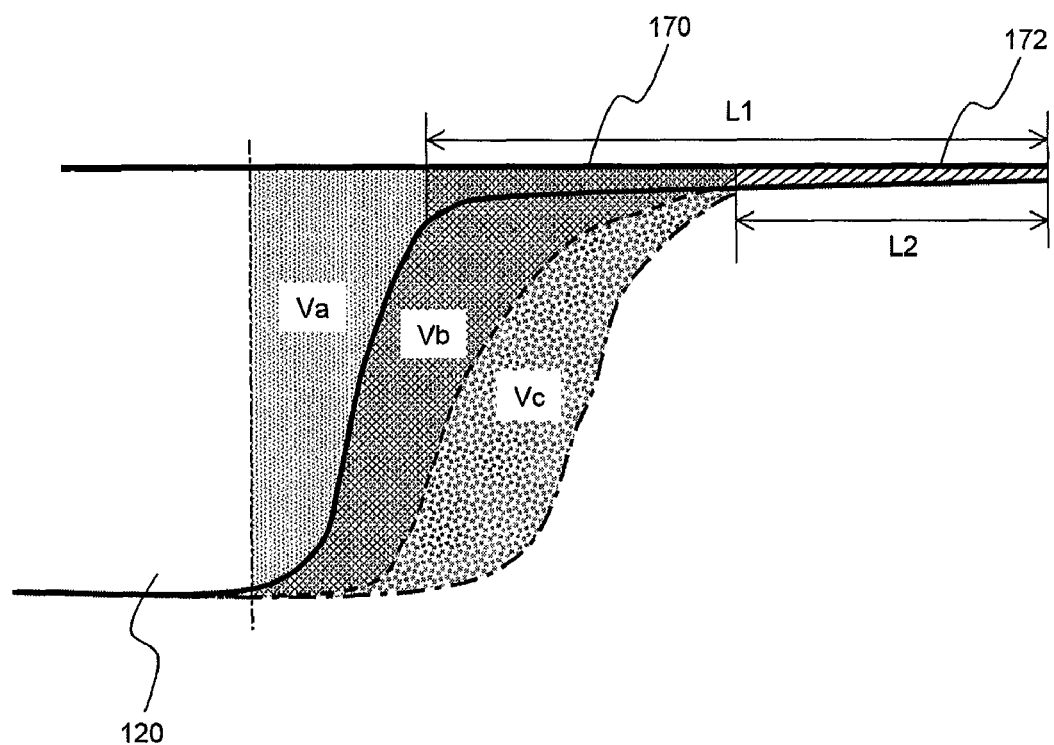
FIG. 8 is a typical view illustrating the occurrence of a swelling phenomenon under an abnormal operating condition of a secondary battery according to the present invention.

FIG. 8 is a typical view illustrating the occurrence of a swelling phenomenon under an abnormal operating condition of a secondary battery according to the present invention.

Referring to FIG. 8, a residue volume Va having a predetermined size, which is formed during a drawing process, exists inside of the electrode assembly receiving part 120 under a normal operating condition. However, gas is generated, under an abnormal operating condition, for example, when the secondary battery is overcharged or exposed to high temperature, with the result that internal pressure is increased to deform the non-sealing residue portion 170. The deformation of the non-sealing residue portion 170 may reach the region where the side sealing portion 172 is formed. Consequently, the residue volume may be changed into a volume deformation Vb or a volume deformation Vc depending upon the amount of gas generated.

The volume deformation Vb and the volume deformation Vc with respect to the residue volume Va are increased in proportion to approximately the length, obtained by subtracting the length L2 of the side corresponding to the side sealing portion 172 from the whole length L1 of the side including the non-sealing residue portion 170, to the third power. Consequently, the amount of gas collectable in the non-sealing residue portion 170 is relatively large.

When the amount of gas generated exceeds the maximum volume deformation Vc of the non-sealing residue portion 170, on the other hand, the sealing portion having the smallest size among the four sides of the battery case, i.e., the side sealing portion 172 adjacent to the non-sealing residue portion 170 is widened, with the result that high-pressure gas is discharged from the battery case. Consequently, the explosion of the battery is prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the secondary battery according to the present invention is constructed in a structure in which the movement of the electrode assembly is restrained, when the battery drops or external impacts are applied to the battery, whereby the occurrence of an internal short circuit is prevented. Furthermore, the non-sealing residue portion primarily expands, when high pressure is generated in the battery due to overcharge of the battery or exposure of the battery to high temperature, whereby the increase in internal pressure of the secondary battery is restrained, and therefore, the safety of the secondary battery is further improved.

What is claimed is:

1. A secondary battery including an electrode assembly comprising a cathode/separator/anode structure mounted in a pouch-shaped battery case in a sealed state, the cathode comprising a cathode active material and the anode comprising an anode active material, wherein a residue portion, which is not sealed (non-sealing residue portion), is defined between a sealing portion of the battery case and the electrode assembly for collecting generated gas, the non-sealing residue portion comprising an outer circumferential end region comprising:
   (a) the electrode assembly mounted between upper and lower laminate sheets, at least one of which has a receiving part of a size corresponding to the electrode assembly;
   (b) the upper and lower laminate sheets having three sealed sides, including two sides where electrode terminals are disposed, among four sides of the upper and lower laminate sheets;
   (c) the non-sealing portion through which an electrolyte can be injected into the battery case;
   (d) thermally welded outer circumferential end region of the non-sealing portion, through which the electrolyte can be injected into the battery case, thereby forming a gas-receiving pocket of a width equivalent to 30 to 60% that of the non-sealing portion in the battery case, an outer end of the gas pocket suitable to be cut in order to:
      (i) remove gas generated during the battery activation process;
      (ii) discharge an excess of the electrolyte; or
      (iii) replenish a shortage of the electrolyte; and
   (e) the cut non-sealing portion thermally welded at a region where the cut non-sealing portion is spaced a predetermined width from the receiving part in which the non-sealing residue portion has a width equivalent to 10 to 40% that of the cut non-sealing portion; and
   (f) a solid electrolyte interface (SEI) film on the surface of the anode active material, the film having been formed as a result of initial charge and discharge of the secondary battery.

2. The secondary battery according to claim 1, wherein the electrode assembly is constructed in a winding, stacking, or stacking/folding type structure.

3. The secondary battery according to claim 1, wherein the battery case is made of a laminate sheet including a resin layer and a metal layer.

4. The secondary battery according to claim 3, wherein the laminate sheet is an aluminum laminate sheet including a resin layer and aluminum as the metal layer.

5. The secondary battery according to claim 1, wherein the laminate sheet is constructed in a structure in which the upper and lower laminate sheets are joined to each other at one-side ends thereof.

6. The secondary battery according to claim 1, wherein the side including the non-sealing residue portion has a width 10 to 50% greater than that of the remaining sides including the sealing portion.

7. The secondary battery according to claim 1, wherein the side including the non-sealing residue portion has a width 15 to 25% greater than that of the remaining sides including the sealing portion, and the non-sealing residue portion has a width equivalent to 20 to 30% that of the cut non-sealing portion.

8. The secondary battery according to claim 1, wherein the battery is a lithium ion polymer battery.

* * * * *